UNITED STATES PATENT OFFICE.

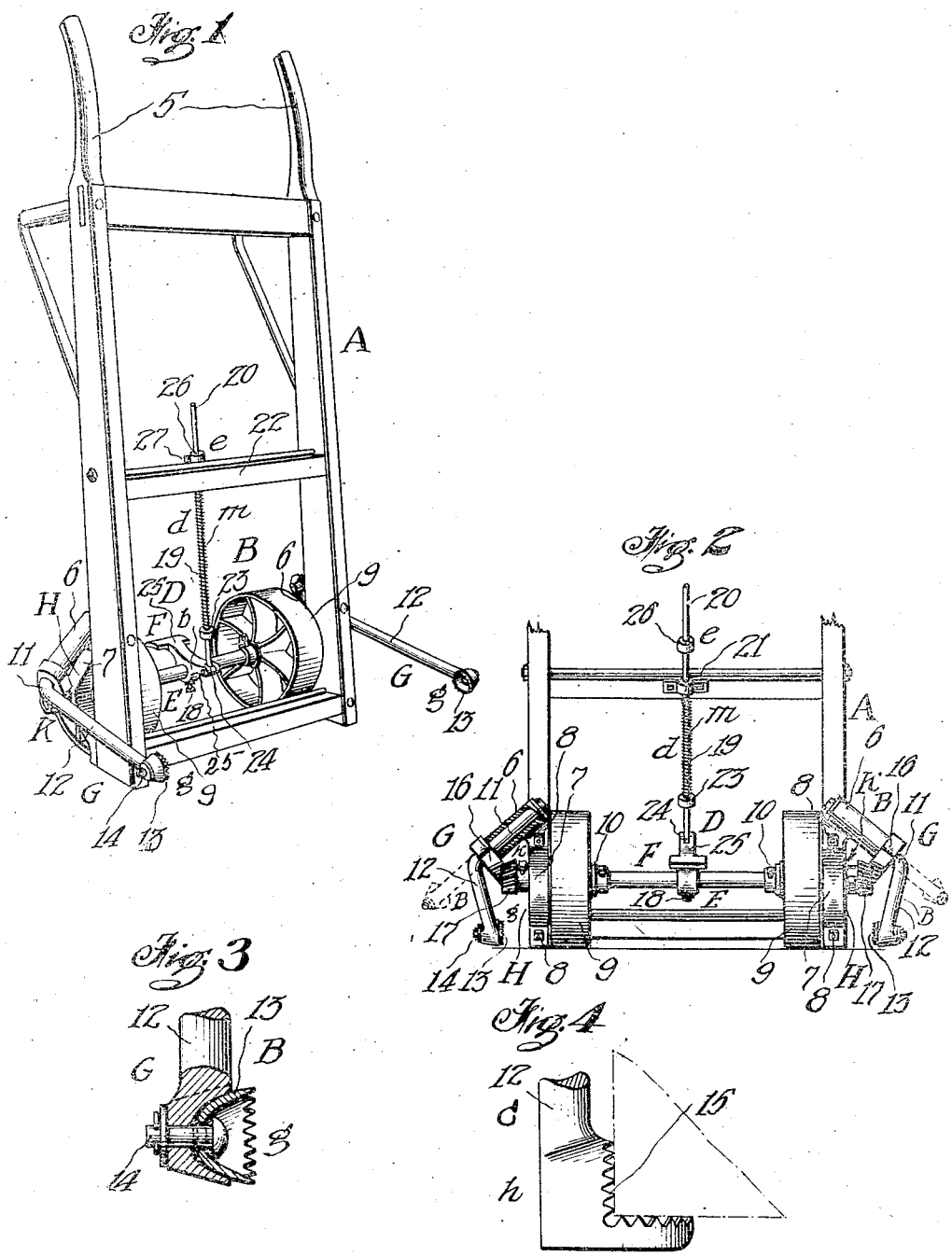

GEORGE D. PARKER, OF RIVERSIDE, CALIFORNIA.

HAND-TRUCK.

943,265.

Specification of Letters Patent. Patented Dec. 14, 1909.

Application filed December 5, 1907. Serial No. 405,267.

*To all whom it may concern:*

Be it known that I, GEORGE D. PARKER, a citizen of the United States, residing at Riverside, in the county of Riverside and State of California, have invented new and useful Improvements in Hand-Trucks, of which the following is a specification.

This invention relates to hand trucks provided with load-holding means, of the same general class as the invention constituting the subject of Letters Patent issued to me August 6th, 1907, No. 862,194.

The load-holding means are adapted and constituted to be engaged with and hold to the truck a box or other load, during transportation of the latter; the weight of the load acting to hold the latter with a force proportional to such weight.

The invention has for its object to provide an improved hand truck equipped or organized with load-holding means, whereby the entirety shall be superior in point of simplicity and inexpensiveness of construction, simplicity and efficiency in use and operation, facility in repair and general efficiency and serviceability.

A particular object of the invention is the provision of improvements of the character described which enables the convenient, simple and inexpensive transformation of an ordinary hand truck into a hand truck embodying the invention.

The invention varies in the construction, combination, association and operation of parts, members and features, from the invention constituting the subject of the recited Letters Patent, in certain particulars, details and features which are radical and distinguishing; and all of which will be manifest from a comparison of the disclosure of the accompanying drawing and the following description and claims with the disclosure of the corresponding parts of said prior patent.

The invention consists in the novel provision, construction, combination and association of parts, members and features, all as hereinafter described, shown in the drawing, and pointed out in appended claims.

In the drawing:— Figure 1 is a perspective front elevation of a hand truck embodying and exemplifying the invention; Fig. 2 is a partial rear elevation of the same, partly in section; Fig. 3 is a fragmentary enlarged sectional view of a detail of construction shown in the other figures; and, Fig. 4 is an enlarged fragmentary view of a modified form of the construction shown in Fig. 3.

Corresponding parts in all the figures are designated by the same reference characters.

Referring with particularity to the drawing, A designates a hand truck frame or body, and B designates load-holding means, in Figs. 1, 2 and 3; C designating load-holding means, of a modified form of construction, in Fig. 4.

D designates operating means for the load-holding means; said operating means embodying or including retraction means $d$.

E designates the hand truck axle, with which the operating means D are associated or combined. The operating means D include or embody a foot lever F; and the load-holding means B include or embody gripping members G, each preferably mounted at one side of the truck. The gripping members G are positively actuated by the foot lever F, to engage the former with the load; and the same are actuated by the retraction means $d$ to withdraw the gripping members from the load. When the gripping members are engaged with the load, and the hand truck is tilted rearwardly, the load is brought to bear against the forward face or side of the hand truck; and upon elevation of the load through the medium of the gripping members G and the hand truck or the frame or body A of the same, or both, the weight of the load causes a gripping pressure of the gripping members G upon the load in proportion to the weight of the latter. After transportation of the load, the hand truck is tilted forwardly; and at the moment that the weight of the load is removed from the gripping members G, the retraction means $d$ cause the disengagement of the gripping members G from the load and their restoration to normal or inoperative positions. The latter positions are those of elevation, the actuation of the gripping members G by the foot lever F causing the depression of the gripping members, or the gripping heads $g$ of the same, combined with movement toward the medial longitudinal plane of the hand truck. In the operation of gripping the load, the latter should be positioned substantially in engagement with the lower front side or face of the hand truck, although the slight yielding of the gripped load under pressure of the gripping heads $g$ causes the load to swing slightly in a direction toward the hand truck.

$e$ designates stop means limiting the action of the retraction means $d$.

A preferred form of construction, combination, and relative arrangement of parts, members and features of a hand truck embodying the invention is as follows:—

The hand truck frame or body A, of any standard or suitable type, is provided with the usual handles 5 at the upper end, and with the axle E at the lower end. At the rear side or face of the hand truck frame A, and at each lateral side of the same, I provide bearings H having two members, 6 and 7 respectively, each of which bearings may be of integral formation, and securely bolted to the hand truck frame, as at 8. The bearings 7 provide journals for the wheels 9 of the hand truck which are loose upon the axle E, being maintained in working positions at opposite sides of the frame by collars 10 upon the axle E. The members 6 of the bearings H are inclined outwardly and downwardly from the sides of the hand truck frame, so that the angles between the axes of the same and medial longitudinal plane of the hand truck frame are less than right angles. The gripping members are mounted in the bearing members 6 respectively, and comprise each a rock shaft 11 operatively secured in one of the bearing members 6, and a rigid gripping arm 12 extending angularly from the outer end of such rock shaft and provided at its own outer end with one of the gripping heads $g$. The gripping arms 12 are positioned to extend forwardly beyond the plane of the forward face or side of the hand truck frame in mutual converging relations. In the form of construction shown in each of the figures with the exception of Fig. 4, each of the gripping heads $g$ comprises a toothed or pronged metallic cup 13 which has a swivel connection with the outer end of the respective arm 12 by a bolt or keyed pin 14. In the form of construction shown in Fig. 4 the arm 12 is provided with a gripping head $h$ having an angular toothed or pronged operative or load engaging surface portion 15.

The operating means D for the gripping arms 12 include the axle E, which acts as a rock shaft, and operative connections K between the axle E and the rock shaft 11 of the gripping arms. The operative connections K, for each of the rock shafts 11, may comprise two beveled gear segments, one, namely 16, being fixed upon the rock shaft 11; and the other, namely 17, being fixed upon the adjacent end portion of the axle F; said gear segments meshing one with the other. The foot lever F is locked to the axle E by a screw or key 18, in proper projection from said axle to suitably control the actuation of the gripping arms 12 through the medium of the axle E and the gear segments 16 and 17.

The retraction means $d$ embody a tension member $m$ consisting of a coiled expansive spring 19 which encircles a rod 20 sliding freely through a keeper 21 secured to the rearward side or face of a cross brace 22 included in the hand truck frame A; said spring 19 bearing at its upper end against said keeper 21, and at its lower end against a stop 23 fixed upon the rod 20. Said rod is pivotally connected at its lower end, as at 24, with an extension 25 of the foot lever F, which extension projects forwardly of the axle E. The stop means $e$ may consist of a collar 26 adjustably mounted upon the rod 20 above the keeper 21 and provided with securing means 27 for its positioning. The elevation of the gripping heads $g$, by the retraction means $d$, acting through the axle E and the gear segments 16 and 17, is regulated and determined by the position of the stop means $e$ upon the rod 20, as will be readily understood, the downward movement of the rod 20 being limited by the engagement of the stop means $e$ with the keeper 21.

The operation, method of use and advantages of the improved hand truck constituting the invention will be readily understood from the foregoing, taken in connection with the drawing and the following statement. In use, the hand truck is brought up to the box or load to be transported, such box or load being of a width within the range of mutual approach and separation of the gripping heads $g$, and the foot lever F is depressed until said gripping heads impinge upon the load. The angularity of the rock shafts 16 causes the gripping heads to converge and move downwardly when the foot lever is depressed. The hand truck is now tilted rearwardly and the weight of the load holds it to the gripping heads which cannot descend lower because their mutual approach is blocked by the load. The load is now transported and deposited, and as soon as the gripping arms are freed from the weight of the load the retraction means $d$ cause the gripping heads to rise in mutual divergence. The load may of course be gripped by the gripping arms 12 themselves.

It is manifest that the utilization of the hand truck axle E as part of the operating means D permits resultant simplicity of organization of the operating means D, with attendant fewness of parts. It is further manifest that an ordinary hand truck may be readily converted into one comprising the invention by substituting the two-membered bearings H for those previously in use, together with the addition of the foot lever F, the retraction means $d$, the gear segments 16 and 17, the rock shafts 11, and the gripping arms 12 which may be integral with the latter and provided with any suitable gripping heads or portions, such as $g$ and $h$.

The entire construction is one of stability and durability, and provides for positive and unfailing action. The gripping heads $g$ turn freely in the adapting of the load to the engaged and supported condition and position, taking torsional strain from the gripping arms 12 and the connected parts.

I do not desire to be understood as limiting myself to the specific construction, combination, association and relative arrangement of parts, members and pieces shown and described; but reserve the right to vary the same, in adapting the improvements to varying conditions of use, without departing from the spirit of the invention or the terms of the following claims:—

Having thus described my invention, I claim and desire to secure by Letters Patent:—

1. In a hand truck, a gripping member and an axle for the truck wheels constituting a rock-shaft to move the gripping member to and from gripping position.

2. A hand truck provided with a gripping member mounted at one side of the same and embodying a pivotally mounted shaft, and operating means for said gripping member comprising the axle of the hand truck and operative connections between the axle and said shaft.

3. A hand truck provided with movable load-holding means, and an axle for the truck wheels constituting means to operate the load-holding means.

4. A hand truck provided with movable load-holding means, and operating means for the load-holding means comprising the axle of the hand truck and operative connections between the axle and the load-holding means.

5. A hand truck provided with movable load-holding means, and operating means for the load-holding means comprising the axle of the hand truck and gears between the axle and the load-holding means.

6. A hand truck provided with a pivotally mounted gripping member comprising a rock shaft and a gripping arm projecting angularly from the same; and with operating means for the gripping member comprising the axle of the hand truck and gears between the axle and the rock shaft.

7. A hand truck provided with movable load-holding means, operating means for the load-holding means comprising the axle of the hand truck and operative connections between the axle and the load-holding means and a foot lever mounted upon the axle; and with retraction means for the load-holding means embodying a tension member operating upon the axle and a stop means whereby the normal position of the load-holding means may be regulated.

8. A hand truck provided with movable load-holding means, and operating means for the load-holding means including the axle of the hand truck, and a foot lever mounted upon the axle.

9. In a truck, gripping members and an axle for the truck wheels, the same constituting a rock shaft to move the gripping members to and from gripping position.

In testimony whereof, I have signed my name to this specification in the presence of two subscribing witnesses.

GEORGE D. PARKER.

Witnesses:
RAYMOND I. BLAKESLEE,
CAL. F. HUNTER.